(12) United States Patent
Arimilli et al.

(10) Patent No.: US 6,282,615 B1
(45) Date of Patent: Aug. 28, 2001

(54) MULTIPROCESSOR SYSTEM BUS WITH A DATA-LESS CASTOUT MECHANISM

(75) Inventors: Ravi Kumar Arimilli; Lakshminarayana Baba Arimilli; James Stephen Fields, Jr.; Sanjeev Ghai, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,044

(22) Filed: Nov. 9, 1999

(51) Int. Cl.[7] .................................................. G06F 12/02
(52) U.S. Cl. ..................... 711/122; 711/143; 711/144; 711/145; 711/146
(58) Field of Search ................................. 711/120, 121, 711/122, 143, 144, 145, 146

(56) References Cited

U.S. PATENT DOCUMENTS 5,623,633 * 4/1997 Zeller et al. .......................... 711/143
5,761,725 * 6/1998 Zeller et al. .......................... 711/146

* cited by examiner

*Primary Examiner*—Hiep T. Nguyen
(74) *Attorney, Agent, or Firm*—Casimer K. Salys; Bracewell & Patterson, L.L.P.

(57) ABSTRACT

A method and apparatus for casting out data within a cache memory hierarchy for a data processing system is disclosed. The data processing system has multiple processing units, each of the processing units having a multi-level cache memory hierarchy. In response to a castout write request from a cache memory to a non-inclusive lower-level cache memory within a cache memory hierarchy, the data transfer is aborted if the lower-level cache memory already has a copy of the data of the castout write. The coherency state of the lower-level cache memory is then updated, if necessary.

10 Claims, 3 Drawing Sheets

MULTIPROCESSOR SYSTEM BUS WITH A DATA-LESS CASTOUT MECHANISM

CROSS-REFERENCE TO A RELATED PATENT APPLICATION

The present invention is related to the subject matter of a co-pending United States Patent Application entitled "METHOD AND APPARATUS FOR A DATA-LESS WRITE OPERATION WITHIN A CACHE MEMORY HIERARCHY FOR A DATA PROCESSING SYSTEM," filed on even date, Ser. No. 09/437,043.

BACKGROUND OF THE INVENTION

1. Technical Field

The present invention relates to cache memories in general and, in particular, to a method and apparatus for casting out data from a cache memory within a data processing system. Still more particularly, the present invention relates to a method and apparatus for casting out data within a cache memory hierarchy for a multiprocessor data processing system.

2. Description of the Prior Art

In a symmetric multiprocessor (SMP) data processing system, all of the processing units are generally identical; that is, they all utilize a common set or subset of instructions and protocols to operate and, generally, have the same architecture. Each processing unit includes a processor core having multiple registers and execution units for carrying out program instructions. Each processing unit may also have a multi-level cache memory hierarchy.

A multi-level cache memory hierarchy is a cache memory system consisting of several levels of cache memories, each level having a different size and speed. Typically, the first level cache memory, commonly known as the level one (L1) cache, has the fastest access time and the highest cost per bit. The remaining levels of cache memories, such as level two (L2) caches, level three (L3) caches, etc., have a relatively slower access time, but also a relatively lower cost per bit. Typically, each lower cache memory level has a progressively slower access time and a lower per-bit cost.

Because there are many possible operating scenarios in which data can be transferred between cache memory hierarchies, and between cache levels within a cache memory hierarchy in a multiprocessor data processing system, it is important to efficiently transfer data from one cache to another. The present disclosure is related to a method and apparatus for casting out data within a cache memory hierarchy of a multiprocessor data processing system. Data may be casted out from one cache to another cache, typically a lower level cache, for data deallocation or other reasons.

SUMMARY OF THE INVENTION

In accordance with a preferred embodiment of the present invention, a data processing system has multiple processing units, each of the processing units having a multi-level cache memory hierarchy. In response to a castout write request from a cache memory to a non-inclusive lower-level cache memory within a cache memory hierarchy, the data transfer is aborted if the lower-level cache memory already has a copy of the data of the castout write. The coherency state of the lower-level cache memory is then updated, if necessary.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any data processing system having a multi-level cache memory hierarchy. Also, it is understood that the features of the present invention may be applicable in various multiprocessor data processing systems, each processor having a multi-level cache memory hierarchy.

Figure 1:
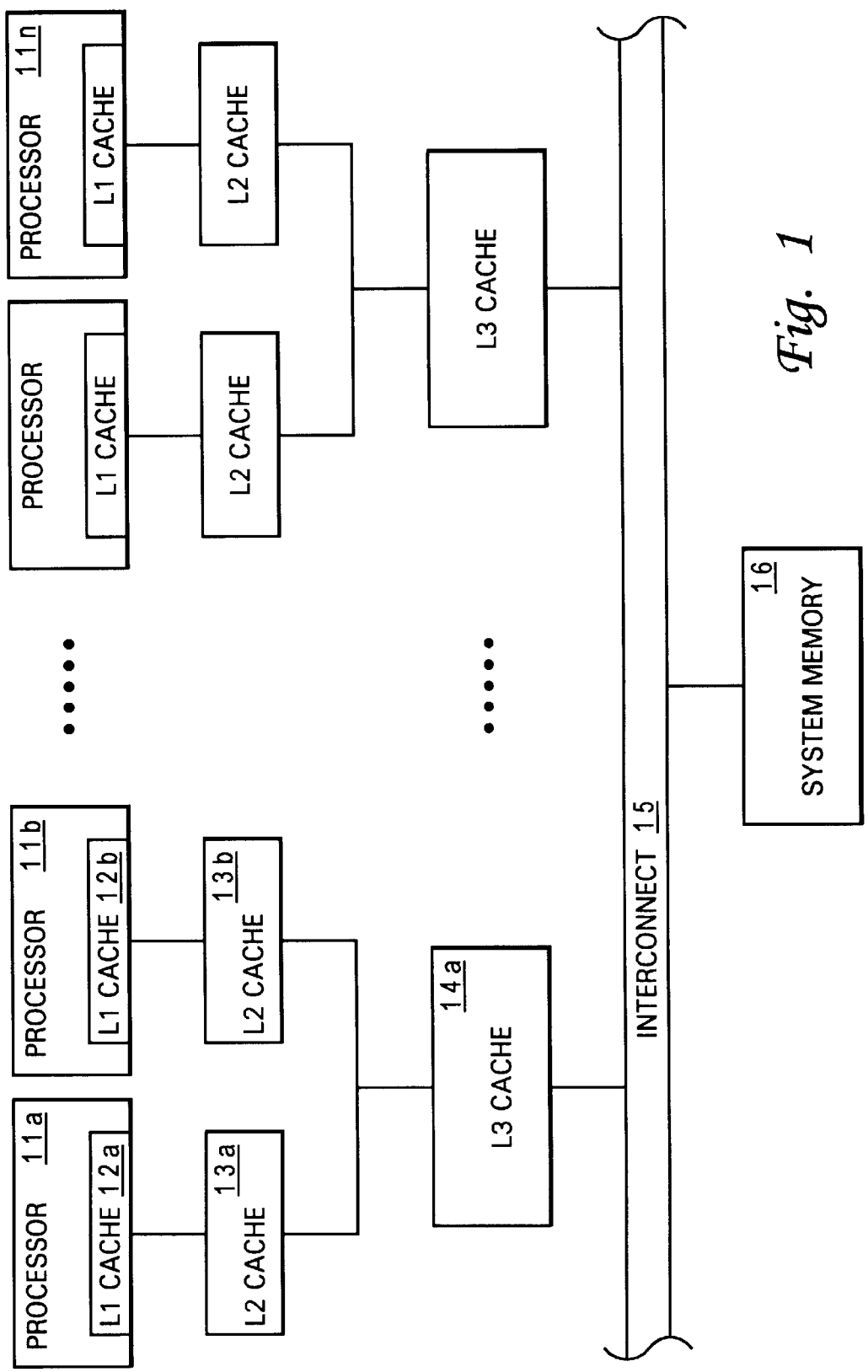
FIG. 1 is a block diagram of a data processing system in which a preferred embodiment of the present invention is incorporated.

Referring now to the drawings and, in particular, to FIG. 1, there is depicted a block diagram of a data processing system in which a preferred embodiment of the present invention is incorporated. As shown, a data processing system 10 includes multiple processors 11a–11n, and each of processors 11a–11n contains a level one (L1) cache. For example, processor 11a contains an L1 cache 12a, and processor 11b contains an L1 cache 12b. Also, each of processors 11a–11n is coupled to a level two (L2) cache. For example, processor 11a is coupled to an L2 cache 13a, and processor 11b is coupled to an L2 cache 13b. In this implementation, two L2 caches are jointly coupled to a level three (L3) cache. For example, L2 caches 13a and 13b are both coupled to an L3 cache 14a.

Processors 11a–11n and their respective cache memory hierarchy are interconnected to each other via an interconnect 15. Interconnect 15 can be implemented as either a bus or a switch. A system memory 16 is also connected to interconnect 15. Although a preferred embodiment of a data processing system is described in FIG. 1, it should be understood that the present invention can be practiced within a variety of system configurations. For example, more than three levels of cache memories can be provided within each cache memory hierarchy.

Figure 2:
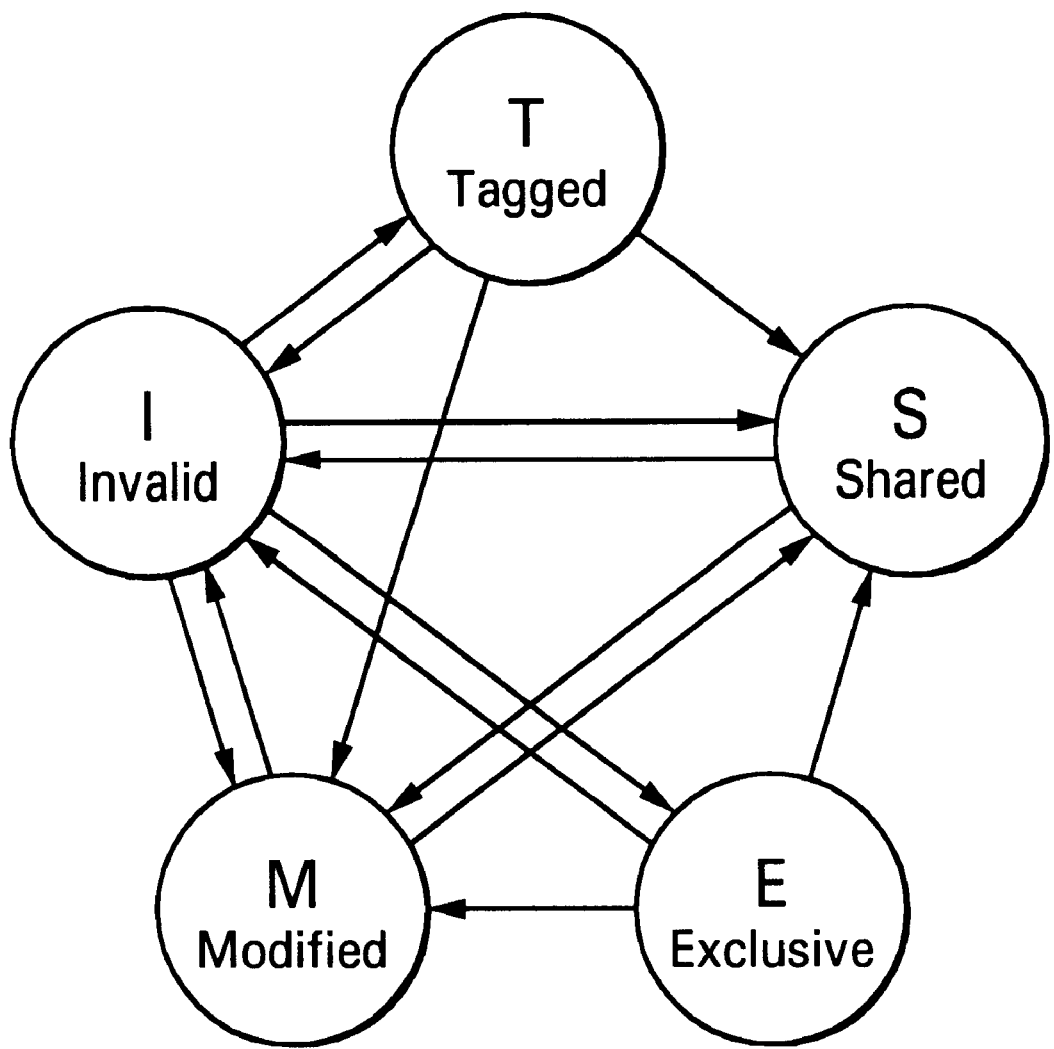
FIG. 2 is a state diagram of a T-MESI cache coherency protocol for the data processing system from FIG. 1, in accordance with a preferred embodiment of the present invention.

With reference now to FIG. 2, there is depicted a state diagram of a T-MESI cache coherency protocol for data processing system 10, in accordance with a preferred embodiment of the present invention. This T-MESI protocol is similar to the prior art MESI protocol in that it includes the same Modified, Exclusive, Shared, and Invalid states, as they are understood by those skilled in the art. But the T-MESI protocol also includes an additional state known as a Tagged state (T state) for providing an indication that a cache block has been modified by a processor but has not yet been written back to a system memory, such as system memory 16 from FIG. 1. For example, when a cache block is in a Modified state in a first processor and a READ operation is requested by a second processor, then the first processor will send a modified intervention response and will source the requested cache block. An intervention is the transfer of data from one processor to another processor on a system bus within a multiprocessor system without going through a system memory. The second processor can thereafter hold the cache block in the Tagged state (while the first processor switches from a Modified state to a Shared state). This operation can be repeated with additional processors such that the cache that has most recently read a copy of the modified cache block will be in the Tagged state while all other processors having copies of the modified cache block will be in the Shared state. In this manner, one cache is "tagged" to indicate that it is currently responsible for writing the modified cache block to the memory hierarchy some time in the future, if necessary, either by sourcing the modified cache block to another cache by modified intervention or by writing back to the system memory.

In contrast, according to the prior art MESI protocol, a cache that reads a copy of a modified value would switch from an Invalid state to a Shared state (rather than to a Tagged state), and the modified intervention response would also be snooped by a memory controller to allow the data to be written to the system memory. In the T-MESI protocol, the memory controller ignores the transaction, and the modified value is written to the system memory only when required, for example, as a result of a least-recently used (LRU) cache deallocation algorithm.

As with the prior art protocol, the four M-E-S-I states may change based on the initial state of the entry and the type of access sought by the requesting processor. The manner in which these four states change is generally identical to the prior art MESI protocol, with the following additions. As shown in FIG. 2, a cache line can switch from an Invalid state to a Tagged state, from a Tagged state to an Invalid state, from a Tagged state to a Modified state, and from a Tagged state to a Shared state. This embodiment of the T-MESI protocol may further be understood with reference to Table I that illustrates the cache coherency states for a particular cache block in three different processors, $P_0$, $P_1$, and $P_2$:

TABLE I

|  | $P_0$ | $P_1$ | $P_2$ |
|---|---|---|---|
| Initial States | I | I | I |
| $P_0$ RWITM | M | I | I |
| $P_1$ Read | S | T | I |
| $P_2$ Read | S | S | T |
| Snoop Push ($P_1$ DClaim) | S | S | I |
| $P_1$ DClaim (after retry) | I | M | I |

In the first row of Table I, all three processors start off with the cache blocks in Invalid states. In the second row, processor $P_0$ executes a read-with-intent-to-modify operation (RWITM), and so its cache line switches from an Invalid state to a Modified state. Thereafter, processor $P_1$ requests a read of the cache line; processor $P_0$ intervenes, switches to the Shared state, and processor $P_1$ switches from the Invalid state to the Tagged state (the third row of Table I). Later, processor $P_2$ requests a read of the cache line; processor $P_1$ intervenes, switches to the Shared state, and processor $P_2$ switches from the Invalid state to the Tagged state (the fourth row of Table I).

Since the data is held in a Shared state in one or more other processors, the Tagged state has qualities of both the Shared state and the Modified state, because the data has been modified and not yet written back to the system memory.

Indeed, from a processor's perspective, the Tagged state is equivalent to the Shared state, but from a system bus' perspective, a cache line with a Tagged state is essentially treated like a cache line in a Modified state.

As a preferred embodiment of the present invention, when a cache attempts to perform a castout write via, for example, a deallocation procedure, to a lower-level cache, the castout write is aborted with no data transfer if the lower-level cache already has a copy of the data of the castout write. The lower-level cache may be a next lower-level cache or any other cache located at a level lower than the castout cache.

Figure 3:
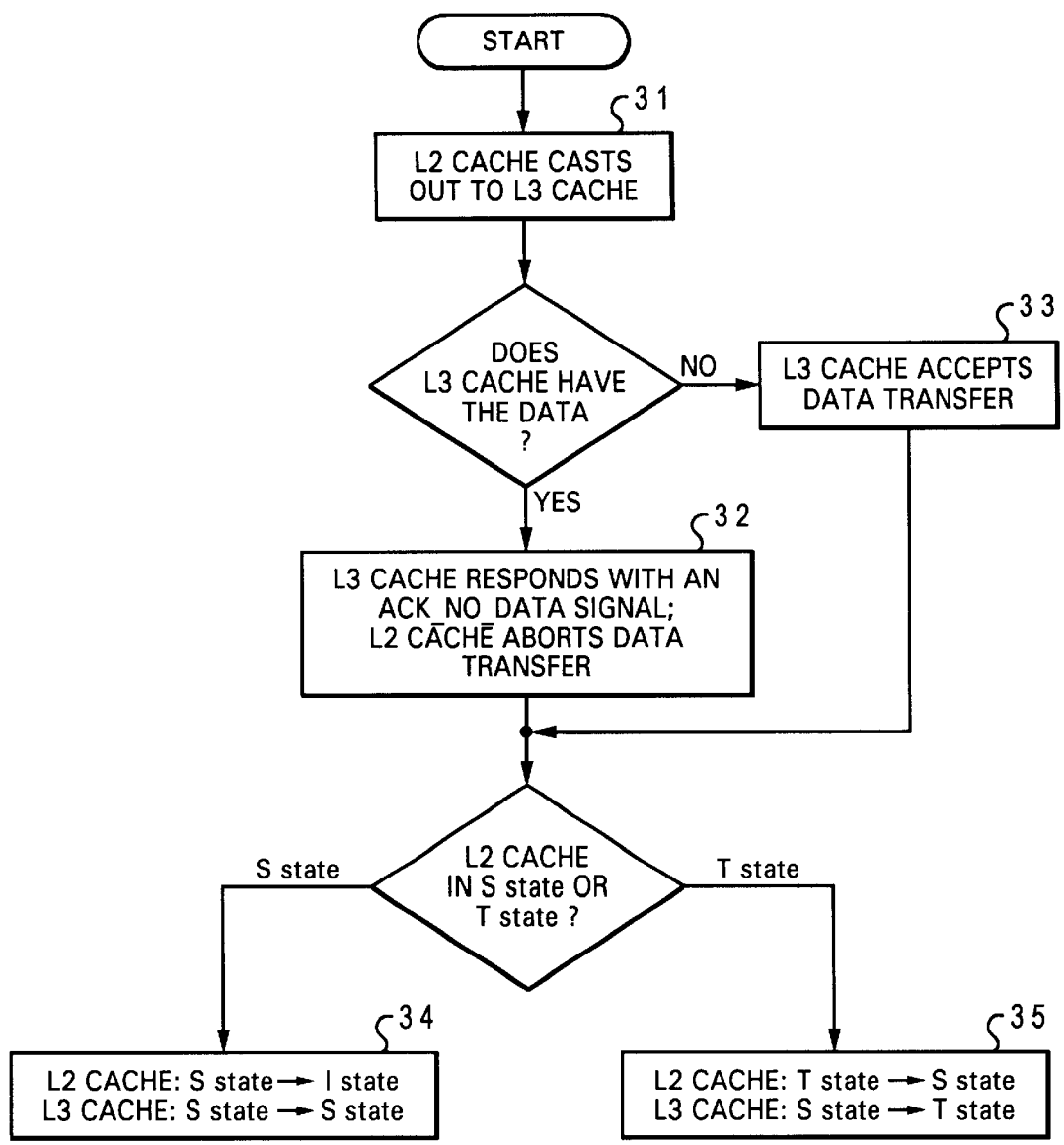
FIG. 3 is a high-level logic flow diagram of a method for casting out data within a cache memory hierarchy for the data processing system from FIG. 1, in accordance with a preferred embodiment of the present invention.

Referring now to FIG. 3, there is illustrated a high-level logic flow diagram of a method for casting out data within a cache memory hierarchy for the data processing system from FIG. 1, in accordance with a preferred embodiment of the present invention. Initially, an L2 cache within a cache memory hierarchy can be either in a Tagged state or in a Shared state. The L3 cache within the cache memory hierarchy is in a Shared state. In addition, the L3 cache is non-inclusive, and can be either an inline or lookaside cache. A cache is inclusive when a block in the cache must also be present in its lower-level cache. The lower-level cache may be a next lower-level cache. At some point, the L2 cache deallocates, for example, and attempts to perform a castout write to move its castout cache block to the L3 cache, as shown in block 31. The L2 cache attempts to perform a castout write to the L3 cache because the L2 cache does not know whether the L3 cache has a copy of the castout data when L3 cache is non-inclusive. If the L3 cache already has the data of the castout block, then the L3 cache responds with an Ack__No__Data signal, and the L2 cache aborts the data transfer to the L3 cache, as depicted in block 32. Otherwise, the L3 cache accepts the data transfer from the L2 cache, as illustrated in block 33. At this point, if the L2 cache was initially in the Shared state, the L2 cache then transitions from the Shared state to an Invalid state while the L3 cache remains in the Shared state, as shown in block 34. Otherwise, if the L2 cache was initially in the Tagged state, the L2 cache then transitions from the Tagged state to the Invalid state while the L3 cache transitions from the Shared state to the Tagged state, as depicted in block 35.

As has been described, the present invention provides a method for casting out data within a cache memory hierarchy for a data processing system. The present invention preserves data bandwidth and allows a cache queue within the L2 and L3 caches to be free up more quickly. In addition to the advantages cited above, the present invention helps to reduce the bandwidth penalty associated with not enforcing inclusivity of the L2 cache by the L3 cache. Without the present invention, either the above-depicted cache block in the L3 cache would never transition to a Shared state, and thus the L2 cache must request/fetch the corresponding data from the system memory once the L2 cache "ages" the cache block out once, or the L2 cache must always castout the cache block to L3 cache with a full address/data write operation. With the present invention, the data bandwidth is only used when the L2 cache is casting out a cache block that did not get allocated into the L3 cache previously.

Although it is not specifically illustrated, it is understood by those skilled in the art that the present invention is also applicable to a cache memory having multiple sectors.

While the invention has been particularly shown and described with reference to a preferred embodiment, it will be understood by those skilled in the art that various changes in form and detail may be made therein without departing from the spirit and scope of the invention.

What is claimed is:

1. A method for casting out data within a cache memory hierarchy of a data processing system, said method comprising:

in response to a castout write request of a cache block from a cache memory to a lower-level cache memory, wherein lower-level cache memory is non-inclusive of said cache memory, aborting a data transfer for said castout write request if said lower-level cache memory already has a copy of said cache block of said castout write request; and updating a coherency state of said lower-level cache memory according to a coherency state of said cache memory.

2. The method according to claim 1, wherein said updating further includes updating a coherency state of said lower-level cache memory to a Shared state if said cache block of said cache memory was in a Shared state before said castout write request.

3. The method according to claim 1, wherein said updating further includes updating a coherency state of said lower-level cache memory to a Tagged state if said cache block of said cache memory was in a Tagged state before said castout write request.

4. The method according to claim 1, wherein said aborting further includes sending an acknowledgement signal from said lower-level cache memory to said cache memory.

5. The method according to claim 1, wherein said method further includes accepting said data transfer if said lower-level cache memory does not have a copy of said cache block of said castout write, in response to said castout write request from said cache memory to said lower-level cache memory.

6. An apparatus for casting out data in a cache memory hierarchy within a data processing system, said apparatus comprising:

means for aborting a data transfer for a castout write request of a cache block from a cache memory to a lower-level cache memory, if said lower-level cache memory already has a copy of said cache block of said castout write request, wherein said lower-level cache memory is non-inclusive of said cache memory; and means for updating a coherency state of said lower-level cache memory according to a coherency state of said cache memory.

7. The apparatus according to claim 6, wherein said updating means further includes a means for updating a coherency state of said lower-level cache memory to a Shared state if said cache block of said cache memory was in a Shared state before said castout write request.

8. The apparatus according to claim 6, wherein said updating means further includes a means for updating a coherency state of said lower-level cache memory to a Tagged state if said cache block of said cache memory was in a Tagged state before said castout write request.

9. The apparatus according to claim 6, wherein said aborting means further includes a means for sending an acknowledgement signal from said lower-level cache memory to said cache memory.

10. The apparatus according to claim 6, wherein said apparatus further includes a means for accepting said data transfer if said lower-level cache memory does not have a copy of said cache block of said castout write, in response to said castout write request from said cache memory to said lower-level cache memory.

* * * * *

UNITED STATES PATENT AND TRADEMARK OFFICE
CERTIFICATE OF CORRECTION

PATENT NO.  : 6,282,615 B1
DATED       : August 28, 2001
INVENTOR(S) : Arimilli et al.

It is certified that error appears in the above-identified patent and that said Letters Patent is hereby corrected as shown below:

Column 3,
Line 60, delete the comma after "$P_1$."

Signed and Sealed this

Thirtieth Day of April, 2002

Attest:

Attesting Officer

JAMES E. ROGAN
Director of the United States Patent and Trademark Office